(12) United States Patent
Karaki

(10) Patent No.: US 7,844,654 B2
(45) Date of Patent: Nov. 30, 2010

(54) ARITHMETIC UNIT OF ARBITRARY PRECISION, OPERATION METHOD FOR PROCESSING DATA OF ARBITRARY PRECISION AND ELECTRONIC EQUIPMENT

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1142 days.

(21) Appl. No.: 11/213,790

(22) Filed: Aug. 30, 2005

(65) Prior Publication Data
US 2006/0106903 A1 May 18, 2006

(30) Foreign Application Priority Data
Nov. 12, 2004 (JP) .............................. 2004-328984

(51) Int. Cl.
*G06F 7/38* (2006.01)
*G06F 7/50* (2006.01)
*G06F 9/30* (2006.01)
*G06F 9/40* (2006.01)

(52) U.S. Cl. ...................... 708/518; 708/670; 708/700; 708/705; 712/210

(58) Field of Classification Search ................ 708/200, 708/490, 518, 521, 522, 550–603, 670, 680–682, 708/700–714; 712/33, 210
See application file for complete search history.

(56) References Cited

U.S. PATENT DOCUMENTS

| | | | | |
|---|---|---|---|---|
| 3,290,511 A | * | 12/1966 | Sims, Jr. ..................... 307/401 |
| 3,751,650 A | * | 8/1973 | Koehn ......................... 708/234 |
| 4,219,874 A | * | 8/1980 | Gusev et al. ................. 712/300 |
| 4,258,419 A | * | 3/1981 | Blahut et al. ................. 712/210 |
| 4,680,701 A | * | 7/1987 | Cochran ....................... 712/40 |
| 5,023,826 A | * | 6/1991 | Patel ........................... 708/518 |
| 5,084,834 A | * | 1/1992 | Hartley et al. ............... 708/707 |
| 5,168,571 A | * | 12/1992 | Hoover et al. ................ 712/210 |
| 5,761,521 A | * | 6/1998 | Chilinski et al. ............... 712/1 |
| 6,044,453 A | | 3/2000 | Paver |
| 6,055,620 A | | 4/2000 | Paver et al. |
| 6,152,613 A | * | 11/2000 | Martin et al. .................. 712/33 |

(Continued)

FOREIGN PATENT DOCUMENTS

DE 3040931 C * 4/1982

(Continued)

OTHER PUBLICATIONS

Richard Hartley and Peter Corbett, "Digit-Serial Processing Techniqes", Jun. 1990, pp. 707-719.*

(Continued)

*Primary Examiner*—Chat C Do
*Assistant Examiner*—Matthew Sandifer
(74) *Attorney, Agent, or Firm*—Oliff & Berridge, PLC

(57) ABSTRACT

An arithmetic unit of arbitrary-precision, including: a main processing unit, which splits up the first and the second arbitrary-precision values into N-bit (where N is a natural number) operands respectively in the-least-significant-bit-first order for computing with the arbitrary-precision data and consecutively outputting a series of pairs of the first and second N-bit operands; and an N-bit arithmetic unit, which performs computing with the N-bit operands, while requesting the main processing unit to feed the next N-bit operands each time the computation completes. The carry bit generated by the operation is fed to the next N-bit operation.

12 Claims, 8 Drawing Sheets

U.S. PATENT DOCUMENTS

| | | | |
|---|---|---|---|
| 6,230,175 B1 * | 5/2001 | Okamoto et al. | 708/319 |
| 6,721,905 B2 * | 4/2004 | Ohwada | 714/30 |
| 2005/0216546 A1 * | 9/2005 | Karaki | 708/702 |

FOREIGN PATENT DOCUMENTS

| | | | |
|---|---|---|---|
| EP | 51154 A1 * | 5/1982 | |
| JP | A-2-171923 | 7/1990 | |
| JP | A-6-35669 | 2/1994 | |
| JP | A-6-332671 | 12/1994 | |
| JP | A-11-154087 | 6/1999 | |
| JP | A-2001-109613 | 4/2001 | |
| SU | 1413624 A * | 7/1988 | |

OTHER PUBLICATIONS

Hogg, Hughes and Lloyd, "A Novel Asynchronous ALU for Massively Parallel Architectures", IEEE, Jan. 1996.*

Mark B. Josephs and Priyadarsan Patra, "An asynchronous bit-serial adder and its delay-insensitive decomposition," Technical report, Oxford University Computing Lab., Oxford, 1992.*

Priyadarsan Patra and Donald S. Fussell, "Fully asynchronous, robust, high-throughput arithmetic structures," International Conference on VLSI Design, IEEE Computer Society, Jan. 1995.*

Povazanec, J.; Choy, C.S.; Chan, C.F., "Asynchronous logic in bit-serial arithmetic," 1998 IEEE International Conference on Electronics, Circuits and Systems, vol. 3, pp. 175-178, 1998.*

Ueno et al.; "Design and Evalutaion of Asynchronous Processor TITAC"; Apr. 1994; pp. 95-102.

Garside et al.; "Monthly Electronics Magazine"; 1998; pp. 69-71.

Imai et al., "An Asynchronous Register Transfer Level Design Model Using Delay Information," 137-142 Technical Report of IEICE (Nov. 23, 2000) (with Partial English Translation).

Hartley et al., Digit-Serial Processing Techniques, Jun. 1990, pp. 707-719.

Behrooz Parhami, Computer Arithmetic Algorithms and Hardware Design, Sep. 1999, pp. 76-78.

M. Morris Mano, "Computer System Architecture $3^{rd}$ Edition", 1993, pp. 104-105.

* cited by examiner

X INPUT : "1101"(={1,0},{1,0},{0,1},{1,0})
Y INPUT : "1000"(={1,0},{0,1},{0,1},{0,1})
OPERATOR INPUT : "0"(={0,1}) i.e. ADDITION

ARITHMETIC UNIT OF ARBITRARY PRECISION, OPERATION METHOD FOR PROCESSING DATA OF ARBITRARY PRECISION AND ELECTRONIC EQUIPMENT

This application claims the benefit of Japanese Patent Application No. 2004-328984, filed Nov. 12, 2004. The entire disclosure of the prior application is hereby incorporated by reference herein in its entirety.

BACKGROUND

The present invention relates to an arithmetic unit performing addition and subtraction, more particularly, an arithmetic unit that is appropriate for calculating data of arbitrary precision, which can exceeds any precisions that computer languages and the compilers can handle.

An arithmetic unit performing addition and subtraction in a processor has been supposed to deal with fixed-length integers. For example, an 8-bit fixed-length full adder for four-rule arithmetic operations and a 16-bit fixed-length full adder that can also be used for address generation have been used for 8-bit microprocessors.

Moreover, when variable-length data is declared in software descriptions, compilers generate a set of instructions to achieve the variable-length arithmetic calculations by iterating a set of the fixed-length full adder operations.

By such complier technique, calculation of the variable-length data could be performed even with the fixed-length full adder.

However, the precision (word length) of data and variables, with which a program can deal, is defined by programming languages and the compilers so that it has been quit difficult for software programs to deal with data of precision exceeding the definitions in the programming languages. Even though programming languages and the compilers cope with the difficulties in calculating variable-length data, extremely large digit number can be bounced out.

For example, hitherto-known computing devices cannot deal with 10,000-digit arithmetic calculations since the precision of the calculations is beyond the precision that the compilers can deal with. In order to achieve the calculations, the specific algorism has to be implemented in programs that handle a 10,000-digit number as a series of numbers, each of which can be handled by the compilers. Even though calculations with very-long-digit numbers can be done by such programming technique, the program shall be a bit complicated and too specific to the precision.

Even if a longer-word-length arithmetic unit, which is capable of calculating longer-fixed-length data at a time, was available, hardware would be quit large and complicated. Above all things, it comes to an essential problem that the calculation algorism specific to the word length had to be specifically implemented.

SUMMARY

An advantage of the present invention is to provide an arithmetic unit for computing with arbitrary-precision data, which can perform arithmetic operations by applying the same calculation algorism irrespective of the precision of the data, in a relatively simple configuration.

According to a first aspect of the invention, an arithmetic unit of arbitrary precision includes a main processing unit and an N-bit arithmetic unit (where N is a natural number). The main processing unit splits up the first and the second arbitrary-precision values into N-bit operands respectively in the-least-significant-bit-first order. A couple of the first and second operands are fed to the N-bit arithmetic unit in sequence. The N-bit arithmetic unit maintains computing with the N-bit operands, while requesting the main processing unit to output the next N-bit operands each time the computation completes. The carry bit generated by the operation is fed to the next N-bit operation.

For example, in the main processing unit, an operation method for computing with arbitrary-precision data is implemented. The main process of operation method for computing with arbitrary-precision data includes the first step of splitting the first and second arbitrary-precision value into N-bit operands respectively in the-least-significant-bit-first order, the second step of outputting a couple of the first and second operands in series and the third step of giving a permission for the second step to proceed to outputting the next couple of the first and the second operands each time the computation completes and the next N-bit operation is requested by the main process.

Meanwhile, for example, the following computing method for computing with arbitrary-precision data is implemented in the N-bit arithmetic unit. The computing method for computing with arbitrary-precision data includes the first step of performing a operation by using a couple of the first and second N-bit operands, the second step of requesting the next couple of the first and second N-bit operands each time the operation completes and the third step of feeding the carry generated by the operation to the next N-bit operation.

According to the above-mentioned first aspect of the invention, the main processing unit splits up an arbitrary-precision or large-number-of-digit value to N-bit operands, the fixed-length of which is specific to the system in the-least-significant-bit-first order. The operands are sequentially sent to the N-bit arithmetic unit starting from the least significant N-bit. The N-bit arithmetic unit executes the operations by using the N-bit operands. The carry is hold for the next operation. The N-bit arithmetic unit requests the next N-bit value from the main processing unit every time the N-bit operation finishes. The main processing unit feeds the next N-bit operands into the arithmetic unit in answer to the request. In this configuration, the large-number-of-digit value is processed N bit by N bit from the least significant bit so that the arithmetic unit can deal with an unlimited-number-of-digit value of extremely high precision even with the physical limits of the arithmetic unit and compilers. Even with such a simple configuration, high-precision computation can be done.

According to the second aspect of the invention, the arithmetic unit of arbitrary precision includes an N-bit full adder and a carry holding circuit. The N-bit full adder adds the first and second N-bit operands and a carry from the preceding operation cycle. The carry generated by the N-bit full adder is held by the carry holding circuit.

The carry held by the holding circuit is generated by the last operation cycle and is added to the least significant bits of the first and second N-bit operands in the current operation cycle. Thereby, the iteration of operation cycles with a carry bit fed forward by the carry holding circuit makes up the whole calculation of arbitrary precision.

The arithmetic unit is preferably provided with a logical negation circuit for generating logical negation of the second operand and a selecting circuit for selecting the logical negation instead of the second operand in case operation indicated by the operator is subtraction.

This configuration makes the N-bit arithmetic unit enable to execute subtraction by adding the first operand and the logical negation of the second operand selected by the selecting circuit.

According to this configuration, in case operation indicated by the operator is subtraction, the carry holding circuit supplies a value "1" just for the first time of the N-bit operation and subsequently the carry generated and carried over from the last operation to the N-bit full adder, which adds the logical negation of the second operand and the value from the carry holding circuit to the first operand to achieve the subtraction. In general, subtraction is made by adding the first operand and the "2's complement" of the second operand. The "2's complement" is made by adding the logical negation or "1's complement" and a value "1". So far, as configured above, subtraction is achieved by using a logical negation circuit, a selecting circuit, a carry holding circuit and an N-bit full adder. Thereby, the iteration of operation cycles with a carry bit fed forward by the carry holding circuit makes up the whole calculation of arbitrary precision no matter which operation the operator indicates; addition or subtraction.

In this case, the arithmetic unit of arbitrary precision may further include a latching circuit, which latches the first and second input values sequentially inputted though the same input port and then supplies to the N-bit full adder. By using the latching circuit, the first and second input values are sequentially inputted though the same input port in multiplex transmission manner. This modification in configuration reduces number of lines of the input port leading to a compact circuit.

Furthermore, it is preferable that the arithmetic unit of arbitrary precision may further include a latching circuit, which first latches and outputs the operator to the selecting circuit preceding the first and second input value. In the configuration, the operator latched in the latching circuit is used for the selecting circuit to select an operation mode out of addition and subtraction and then the first and second input values are consecutively latched.

The arithmetic unit of arbitrary precision according to the third aspect of the invention includes a means of splitting the first and second arbitrary-precision value into N-bit (where N is a natural number) operands in the-least-significant-bit-first order for the N-bit arithmetic unit. It also includes a means of sequentially outputting the series of pairs of the first and second operands to the N-bit arithmetic unit.

The third aspect of the invention relates to a configuration of the main processing unit. The arbitrary-precision input values of both the first and second values are split up into any numbers of N-bit operands in the-least-significant-bit-first order for the N-bit arithmetic unit so that computation of arbitrary precision can be achieved.

It is preferable that the first and second N-bit operands are outputted each time the next N-bit operation is requested. In this way, the next pair of N-bit operands is outputted to the N-bit arithmetic unit after the preceding N-bit operation completes so that any timing consideration of the arithmetic unit is required as far as the handshaking protocol between the sub-circuits is secured. So far, it is particularly appropriate for asynchronous circuits to take the responsibility of securing the handshaking protocol between the sub-circuits by using request and acknowledge signals.

It is preferable that the arithmetic unit is capable of supplying the N-bit arithmetic unit with an operator instructing the N-bit arithmetic unit to perform addition or subtraction and signaling the end of the arbitrary-precision calculation when the operation with the most significant N-bit operands completes by supplying the N-bit arithmetic unit with the specific value of operator. In this way, it is possible for the N-bit arithmetic unit to recognize the end of the operation of the arbitrary-precision value by monitoring the operator.

Furthermore, it is preferable that both input and output values are encoded in the dual-rail encoding scheme. By using the dual-rail encoding scheme, data transmissions are done without clocking so that the circuit can be simply configured.

It is also preferable that the arithmetic unit of arbitrary precision includes asynchronous circuits driven by handshaking scheme. Since the configuration of iteration of the simple operation and the asynchronous circuit can exerted the performance to the maximum level, it is possible to compute at high speed even in case the arbitrary-precision value has a large number of digits.

Moreover, the arithmetic unit according to the aspect of the invention may include synchronous circuits driven by a global clock. The aspects of the invention can also be applied to a synchronous circuit configuration.

Electronic equipment, which includes the above-described arithmetic unit of arbitrary precision, is also encompassed by the invention. The arbitrary-precision arithmetic unit according to the above-mentioned aspect of the invention has a high degree of availability for the general equipments because it can perform the high-precision operation with the simple circuit configuration.

BRIEF DESCRIPTION OF THE DRAWINGS

The invention will be described with reference to the accompanying drawings, wherein like numbers refer to like elements, and wherein.

DETAILED DESCRIPTION OF EMBODIMENTS

The following description will be given by way of example only and it will be appreciated by a person skilled in the art that modifications can be made without departing from the scope of the invention.

First Embodiment

The first embodiment of the invention relates to an example in which an arithmetic unit of arbitrary precision is constructed by using an N-bit (where N is integers with more than 0) fixed-length full adder.

Figure 1:
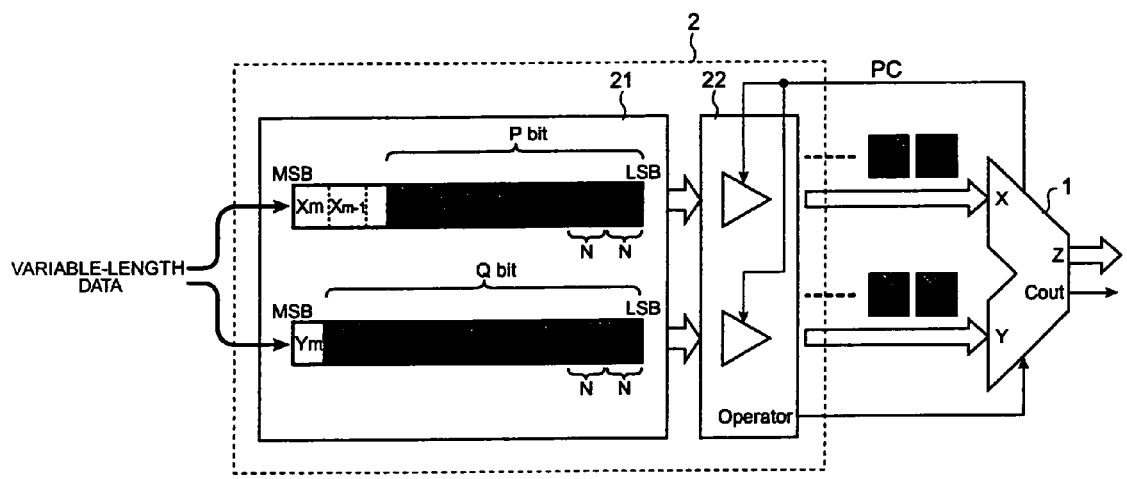
FIG. 1 is a system chart of an arithmetic unit of arbitrary precision according to the invention.

FIG. 1 is a system chart of the arithmetic unit for arbitrary-precision data according to the invention. As shown in FIG. 1, the arithmetic unit for arbitrary-precision data consists of a main processing unit 2 and an N-bit arithmetic unit 1.

The main processing unit 2 splits up the first arbitrary-precision value X into a series of N-bit operands and the second arbitrary-precision value Y into a series of N-bit operands in the-least-significant-bit-first order. The main processing unit 2 then outputs the pair of X and Y series of the N-bit operands sequentially, that is, a pair of $X_1, X_2 \ldots X_m$ and $Y_1, Y_2 \ldots Y_m$. Subsequently, the N-bit arithmetic unit 1 performs an operation between the first input value $(X_1, X_2 \ldots X_m)$ and the second input value $(Y_1, Y_2 \ldots Y_m)$. Each time the operation finishes, the N-bit arithmetic unit 1 outputs a signal PC, which requests the next N-bit operation, to the main processing unit 2 and adds the carry, which is generated from the operation, to the next N-bit operation.

In this specification, "X" in capital letter denotes the original arbitrary-precision value and "Xn" ($1 \leq n \leq m$) denotes each N-bit block which is split from the original arbitrary-precision value and has the N bit length. In addition, "x (n)" ($0 \leq n \leq N-1$) in lower case letter designates the nth-bit data in the N-bit block and "x_1" and "x_0" respectively designates coded data which is encoded by a dual-rail encoding method.

Figure 2:
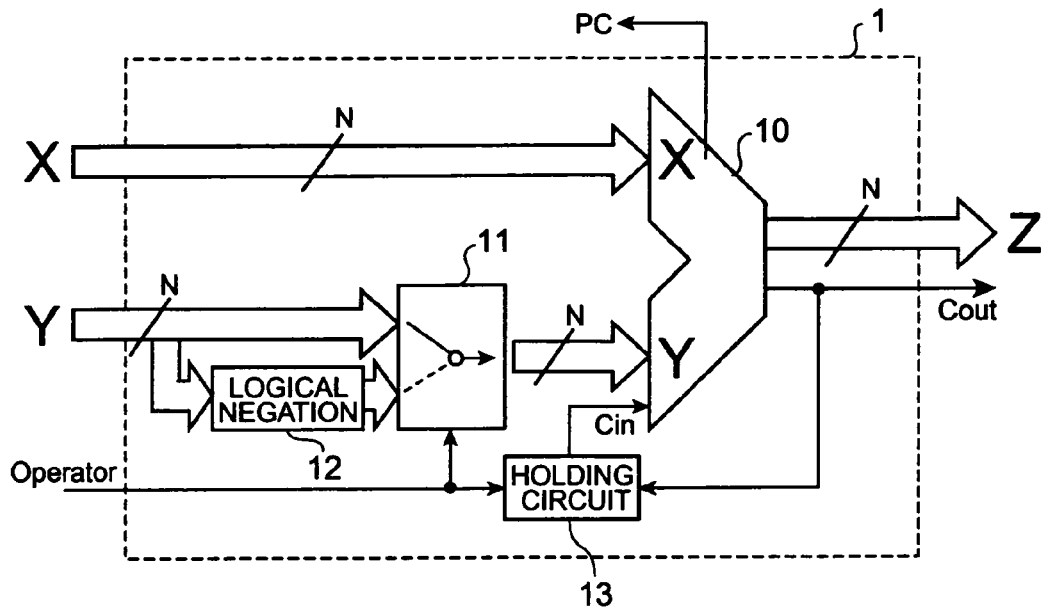
FIG. 2 is a block diagram of an N-bit arithmetic unit according to a first embodiment.

To be more specific, the main processing unit 2 has a means of splitting 21 and a means of outputting 22. The split means 21 splits up the first arbitrary-precision value X and the second arbitrary-precision value Y by N-bits each in the-least-significant-bit-first order and normalizes them by multiplies of N. Both the first arbitrary-precision value X and the second arbitrary-precision value Y are divided by N bit into the same number "m" (where "m" is integers with more than 0). For example, suppose that the first arbitrary-precision value X is P bits ($N<P \leq m*N$) and the second arbitrary-precision value Y is Q bits ($P<Q$) as shown in FIG. 2. When these are divided by the N bit in the-least-significant-bit-first order, as for Y, a most significant bit (MSB) is allocated to the mth N-bit block in Y. "0" will be set to bits in higher order than the MSB in the mth N-bit block. However, as for X, the MSB is allocated to somewhere in between the top and the bottom block (for example, (m−2)th) because the first arbitrary-precision value X has a smaller bit number than that of the second arbitrary-precision value Y. In the same way as Y, "0" will be set to bits in higher order than the MSB which is located in the (m−2)th N-bit block in the first arbitrary-precision value X. Furthermore, rest of bits in the (m−1)th N-bit block and the mth N-bit block are all set to be "0".

The output means 22 sequentially outputs the segments of the first arbitrary-precision value X as the first input values $(X_1, X_2 \ldots X_m)$ which have N-bit length each and the segments of the second arbitrary-precision value Y as the second input values $(Y_1, Y_2 \ldots Y_m)$ which also have N-bit length each to the N-bit arithmetic unit 1. Here, the output means 22 outputs the first input value and the second input value in the next N bit each time the N-bit arithmetic unit 1 requests the next N-bit operation. In other words, the output means 22 outputs the next N-bit block every time the pre-charge (PC) signal PC, which is the request signal from the N-bit arithmetic unit 1, is sent.

Moreover, the main processing unit 2 is made to be capable of outputting an operator "Operator" that instructs the N-bit arithmetic unit 1 to perform addition or subtraction. A recognition information "Null" informing the end of the operation of the arbitrary-precision data is outputted as the operator "Operator" when the operation of the most significant N bit finishes.

According to the main processing unit 2 described above, the next N-bit value is outputted after the operation of the N bit is finished so that an output timing of the output means 22 does not have to be changed according to a processing speed of the N-bit arithmetic unit 1. Particularly, it is better suited for an asynchronous circuit configuration because it is a handshake method in which output is conducted as well as a request is generated. This configuration will hereinafter be described in detail.

Furthermore, only the main processing unit can tell whether the mth operation of the N-bit block is finished or not. However, according to the main processing unit 2 described above, the N-bit arithmetic unit 1 monitors the operator "Operator" and it can recognize the completion of the operation of the arbitrary-precision value.

FIG. 2 is a block diagram of the N-bit arithmetic unit 1. The N-bit arithmetic unit 1 can be either a synchronous circuit or an asynchronous circuit. The N-bit arithmetic unit 1 shown in FIG. 2 has an N-bit full adder 10, a selection circuit 11, a logical negation circuit 12 and a holding circuit 13. The N-bit full adder 10 adds the N-bit long first input value $(X_1, X_2 \ldots X_m)$, which is provided by splitting the first arbitrary-precision value X by N bits from it lower order, to the N-bit long second input value $(Y_1, Y_2 \ldots Y_m)$ which is provided by splitting the second arbitrary-precision value Y by N bits from it lower order. This adder is a fixed-length (N-bit) adder. The logical negation circuit 12 generates a logical negation of the second input value $(Y_1, Y_2 \ldots Y_m)$. In other words, the logical negation circuit 12 calculates 1's complement of the second input value. When the operator "Operator", which instructs addition or subtraction, indicates the subtraction, the selection circuit 11 outputs the calculated second input value, which is provided from the logical negation circuit 12 instead of the original second value and to which the logical negation operation is performed, to the N-bit full adder 10. The operator "Operator" specifies the beginning of the operation and the arithmetic operation mode. For example, when the Operator is "0", it indicates the addition, and when the Operator is "1", it indicates the subtraction. The selection circuit 11 is a so-called multiplexer. When the operator "Operator" is "0", the selection circuit 11 outputs the second input value itself which is supplied from the main processing unit 2 and to which the logical negation operation is not performed. When the operator "Operator" is "1", the selection circuit 11 outputs the calculated second input value to which the logical negation operation is performed. In this way, it is possible to execute the addition and the subtraction by only conducting the arithmetic addition in the N-bit full adder 10 side. The holding circuit 13 serves as a latching circuit that holds a carry "Carry" such that the carry can be added to the least significant bit at the time of the next N-bit operation. The carry "Carry" is generated from the addition by the N-bit full adder 10. If the condition in which the operator "Operator" is "1" is defined as the subtraction, it is preferable that the value "0" in the operator is added as a carry input "Cin" at the time of the first N-bit operation. This is because the subtraction is carried out by adding 2's complement of the subtrahend to the minuend. The 1's complement is produced in the logical negation circuit 12. Therefore, the 2's complement can be generated by adding the "0" of the operator "Operator" to the 1's complement and the accurate subtraction can be implemented.

Though the operator "Operator" is directly provided to the selection circuit 11 in the circuit shown in FIG. 2, the operator "Operator" may be once inputted into the holding circuit 13 and then it may be provided to the selection circuit 11 through the holding circuit 13 or other latch circuit. For example, when a coded operator "Operator" encoded by the dual-rail encoding is provided, the operator takes 2-bits configuration and can represent four values (see Table 1). To illustrate, the invalid codeword "Null" is defined as a non-operation identifier indicating that the operation is not performed and the valid codeword "0"/"1" is defined as an addition/subtraction identifier. When the operator becomes the valid codeword other than "Null", the valid codeword is latched and the operation which the valid codeword indicates is started. This valid codeword is retained until the next invalid codeword "Null" is outputted to the operator. In this way, it is possible to specify the beginning of the operation and the operation mode at the same time by controlling the operator "Operator". A circuit holding the operator "Operator" and the holding circuit 13 holding the carry "Carry" may be made of the same circuit or separate circuits.

The above-described N-bit arithmetic unit 1 has the logical negation circuit 12 and the selection circuit 11 in which whether the second input value is directly outputted or it is outputted after the logical negation is chosen according to the value of the operator "Operator". Thereby, it is possible to determine the addition or the subtraction depending on the value of the operator "Operator".

Furthermore, according to the N-bit arithmetic unit 1 described above, the holding circuit 13 supplies the carry "Carry" generated from the previous addition to the N-bit full adder 10. Thereby, the divided input values having N-bit length each can be coupled each other with the carry and it makes it possible to repeatedly perform the operation of the input values which could be described as the operations of the input values in rows. In this way, the addition and subtraction of the numeric values with any precision can be performed regardless of their digit number.

First Practical Example

Figure 3:
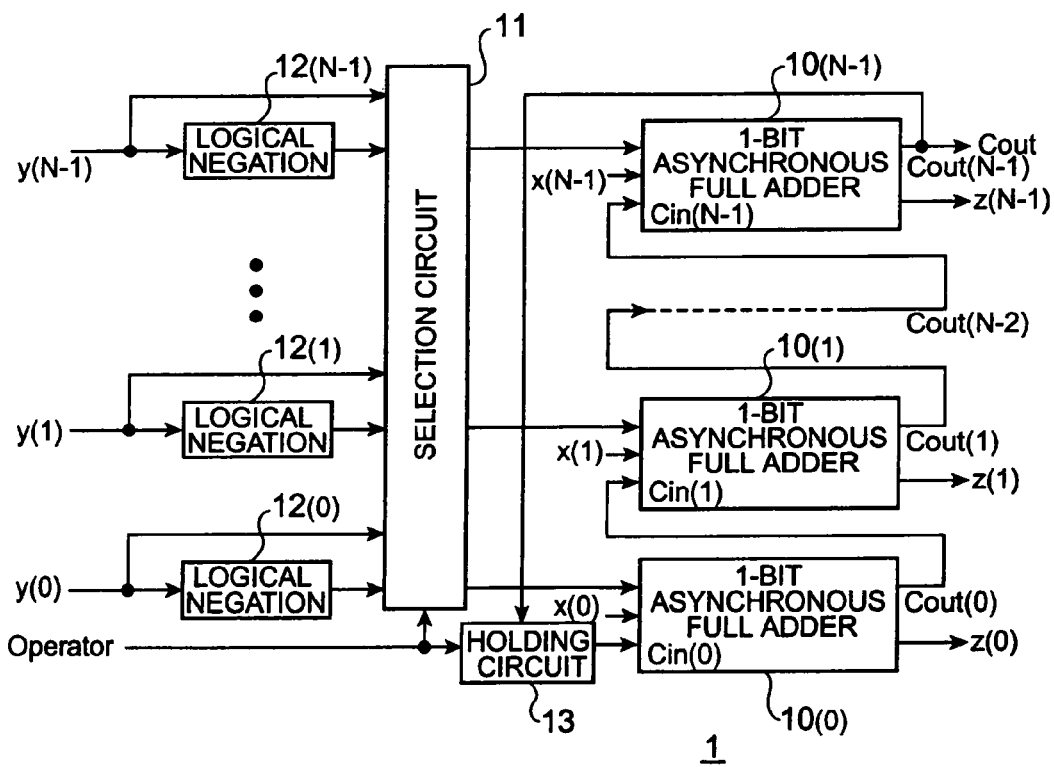
FIG. 3 is a block diagram of an N-bit arithmetic unit according to a first practical example.

FIG. 3 shows a practical example of the N-bit arithmetic unit in the asynchronous circuit configuration.

As shown in FIG. 3, the N-bit arithmetic unit 1 of the practical example is made of N of 1-bit asynchronous full adders 10 (0) though 10 (N−1) as the N-bit full adder 10. Each of the 1-bit asynchronous full adders 10 (0) though 10 (N−1) is coupled with one another. The selection circuit 11 outputs the second input values (y [0] . . . y [N−1]) in parallel. The logical negation circuits 12 (0) though 12 (N−1) are provided with respect to each bit.

The asynchronous circuit configuration is provided in all the circuit configurations of the 1-bit asynchronous full adders 10 (n), the selection circuit 11, the logical negation circuit 12 (n) and the holding circuit 13. Each bit-input/output in each circuit is encoded by the dual-rail encoding and works asynchronously. The basic mechanism is the same as that of FIG. 2 except that the 1-bit asynchronous full adders 10 (n) and the logical negation circuit 12 (n) handle the 1 bit data that is encoded by the dual-rail encoding. Though each data line is shown in the one signal line as if it is in a usual synchronous circuit configuration in this first practical example, the data may be encoded by the dual-rail encoding. When the dual-rail encoding is employed, the signal line consists of two lines. This means that the data line X (n) shown in the figure, for example, includes encoded two lines Xn_1 and Xn_2. Truth table of a bit "b" that is encoded by the dual-rail encoding is shown in Table 1.

TABLE 1

|  | b_0 | b_1 |
|---|---|---|
| "Null" | 0 | 0 |
| "0" | 0 | 1 |
| "1" | 1 | 0 |
| "inhibit" | 1 | 1 |

As show in Table 1, the bit data "b" is converted into {b_1, b_0} by the dual-rail encoding. The bit data "b" can take values of the valid codeword "0"/"1" and the invalid codeword "Null". The valid codeword "0" is converted into {0, 1}, the valid codeword "1" is converted into {1, 0} and the invalid codeword "Null" is converted into {0, 0}. Input and output of the data is carried out by using the valid codeword. The invalid codeword "Null" is used for a data separation as well as showing the non-operation state. In other words, if the same valid code-words are consecutively inputted into the 1-bit asynchronous full adder 10, a receiving circuit cannot recognize the arrival of the data. For this reason, the valid codeword and the invalid codeword are sent alternatively in order to make the valid codeword recognizable.

For example, four bits data "1", "1", "0" and "1" is converted into respectively [1, 0], [1, 0], [0, 1] and [1, 0] by the dual-rail encoding and then inputted. The encoding method shown here is just an example and not particularly limited. However, it is preferable that it can encode at least the valid codeword "1" and "0" and the invalid codeword "Null".

{1, 1} is an inhibited state and if such value is inputted, the circuit side can exclude it. In this case, it is preferable that the operation is stopped and an abnormal state occurrence alert is outputted as soon as the inhibited state is detected in terms of annunciation of glitch. This can prevent the wrong data from being transmitted.

Even if bits of the data arrive at different time points, together with such dual-rail encoding and the asynchronous circuit configuration, the circuit can accept the time difference between the bits. In other words, even if element delay or wiring delay occurs in bit-data signal lines and data consequently arrive at different time points, the asynchronous circuit performs the output when all the input data arrived. This means that the asynchronous circuit essentially waits the arrival of the last data and then starts the operation.

Each bit data shown in FIG. 3 is encoded based on the scheme shown in Table 1. A bit data input value "x (n)" of the first input value X is converted into {x_1, x_0} by the dual-rail encoding. In the same manner, a bit data of the second input value Y, a carry input "Cin (n)", an addition output "z (n)" and a carry output "Cout (n)" are respectively converted into {y_1, y_0}, {Cin_1, Cin_0}, {z_1, z_0} and {Cout_1, Cout_0} by the dual-rail encoding. Truth table of each value in the 1-bit asynchronous full adder 10 (n) is shown in Table 2.

TABLE 2

| Input | | | Output | |
|---|---|---|---|---|
| X | Y | Cin | Z | Cout |
| "0" | "0" | "0" | "0" | "0" |
| "0" | "0" | "1" | "1" | "0" |
| "0" | "1" | "0" | "1" | "0" |
| "0" | "1" | "1" | "0" | "1" |
| "1" | "0" | "0" | "1" | "0" |
| "1" | "0" | "1" | "0" | "1" |
| "1" | "1" | "0" | "0" | "1" |
| "1" | "1" | "1" | "1" | "1" |

The bit data input value "x (n)" of the first input value X and a bit data "y (n)" of the second input value Y that are encoded by the dual-rail encoding are inputted in the 1-bit asynchronous full adder 10 (n). A carry "Cout (n−1)" that is inputted from the one-step lower 1-bit asynchronous full adder 10 (n−1) is then added as the carry input "Cin (n)". As for the carry input "Cin (0)" for the bottom 1-bit asynchronous full adder 10 (0), a final carry output that is generated from the previous N-bit block addition and retained in the holding circuit 13 is used. In other words, a carry output "Cout (N−1)" from the top 1-bit asynchronous full adder 10 (N−1) is used as the carry input "Cin (0)". If the generated carry is "1", the carry "Carry" is encoded as {1, 0}. If the generated carry is "0", the carry "Carry" is encoded as {0, 1}. If any one of the input values x (n), y (n) and Cin (n) is "Null" (=[0, 0]), the values of output z (n) and Cout (n) become "Null" (=[0, 0]). When the valid codeword "1"/"0" is inputted into all the input values, the 1-bit asynchronous full adder 10 (n) outputs "0"/ "1" to the output z (n) and Cout (n) according to the truth table shown in Table 2 after a lapse of a certain delay time.

When the first input value x (n), the second input value y (n) and the carry input Cin (n) are the input value, and the addition output z (n) and the carry output Cout (n) are the output value, there is a relation among these values in the 1-bit asynchronous full adder, which is expressed by the following formulas (1) and (2).

$$z(n)=x(n)(+)y(n)(+)Cin(n) \quad (1)$$

$$Cout(n)=X(n)\cdot Y(n)+Y(n)\cdot Cin(n)+Cin(n)\cdot X(n) \quad (2)$$

Here, "(+)" designates exclusive OR. Table 2 is the truth table for the formulas (1) and (2) and shows all the combinations among the input values.

Figure 4:
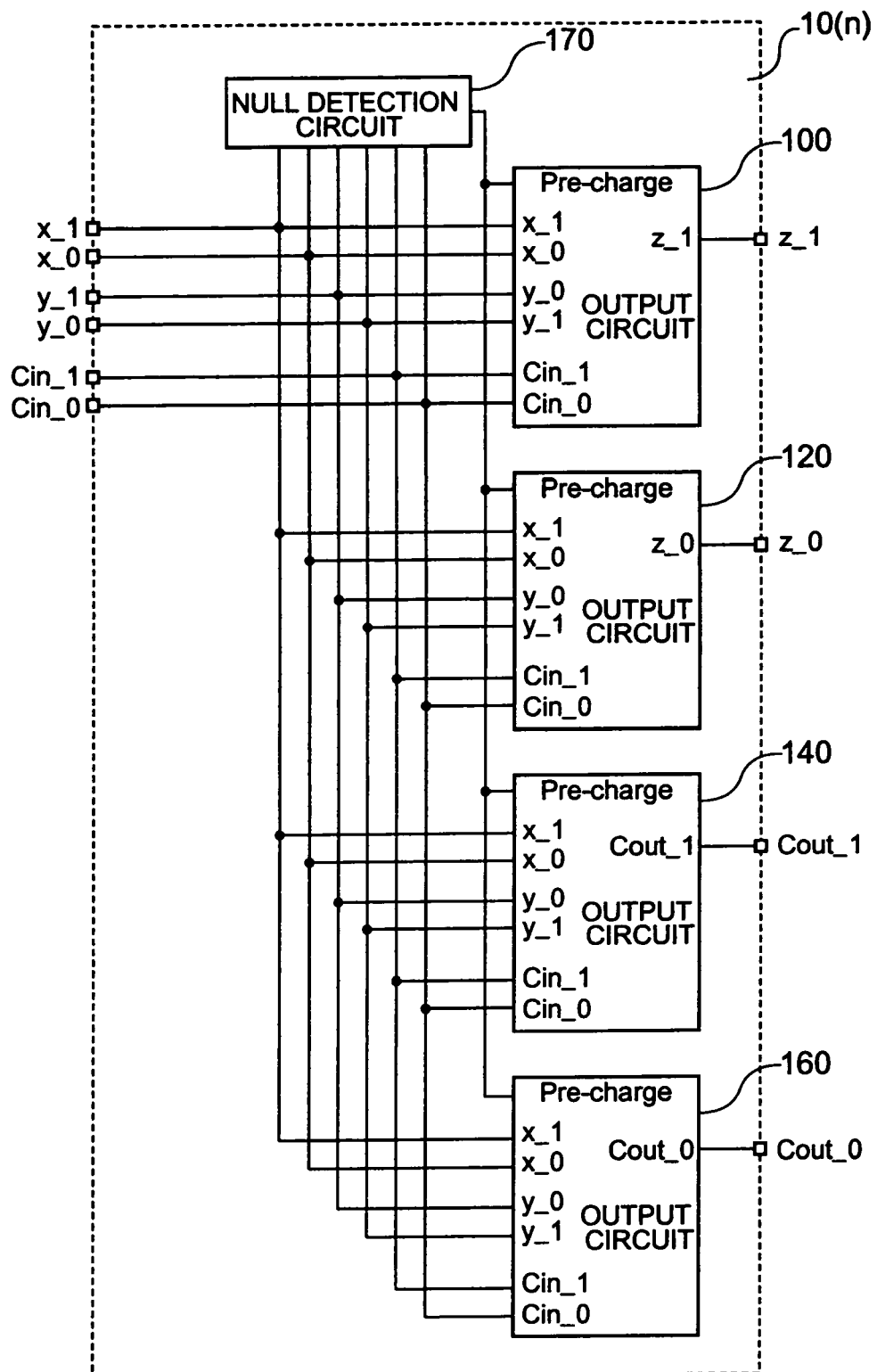
FIG. 4 is a block diagram of a 1-bit asynchronous full adder according to the first practical example.
Figure 5:
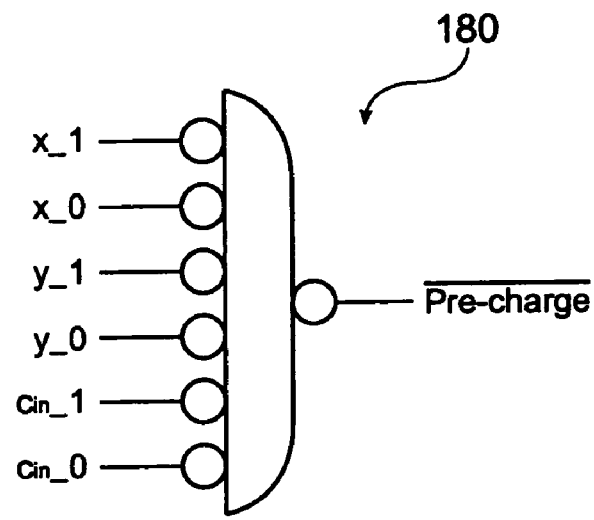
FIG. 5 is a schematic diagram of a null detection circuit.
Figure 6:
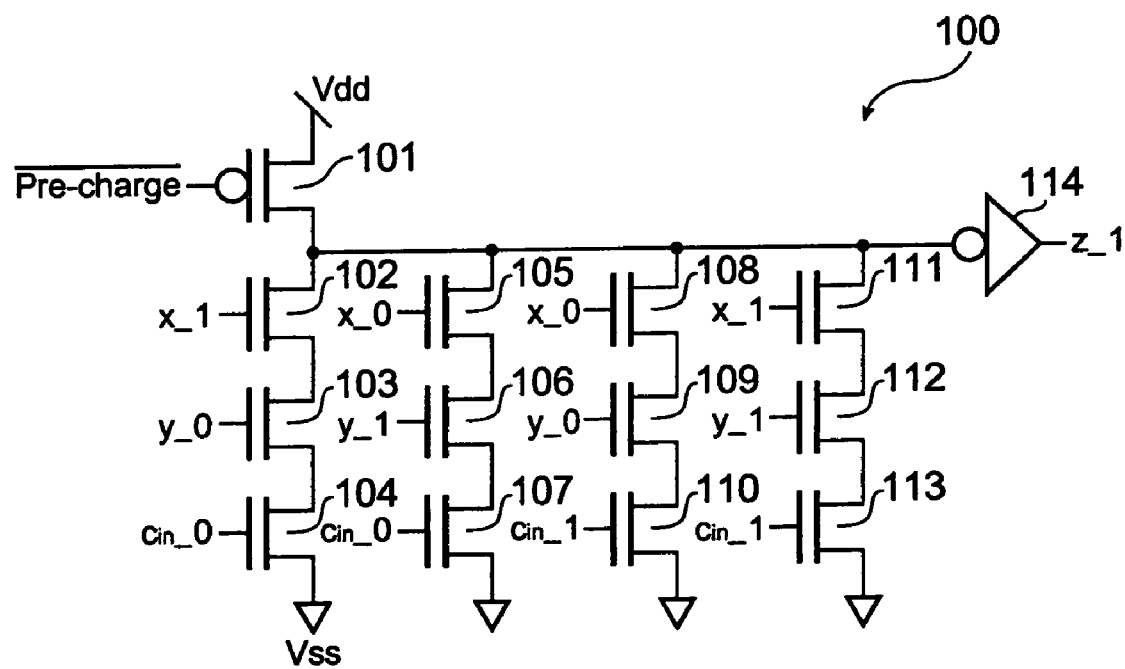
FIG. 6 is a block diagram of a z_1 output circuit.

FIG. 4 is a block diagram of the 1-bit asynchronous full adder 10 (n), FIG. 5 is a circuit diagram of a Null detection circuit and FIGS. 6 though 9 are circuit diagram of output circuits "Z_1", "Z_0", "Cout_1" and "Cout_0". The circuit configurations shown in the figures are just examples and various modifications can be applied.

As shown in FIG. 4, the 1-bit asynchronous full adder 10 (n) includes, for example, a Null detection circuit 170, a Z_1 output circuit 100, a Z_0 output circuit 120, a Cout_1 output circuit 140 and a Cout_0 output circuit 160. Each circuit has an asynchronous circuit configuration.

The Null detection circuit 170 outputs "L" level to the pre-charge signal PC when all the input values x (n), y (n) and Cin (n) become "Null". The Null detection circuit 170 outputs "H" level to pre-charge signal PC in other cases. The all the input values x (n), y (n) and Cin (n) become "Null" when the operation is not performed at the time of the interval between the data. It can tell from the FIGS. 6 through 9 that the output of each output circuit becomes "L" level at the time of the pre-charge. Therefore, "Null" is outputted to all the outputs z (n) and Cout (n).

Figure 7:
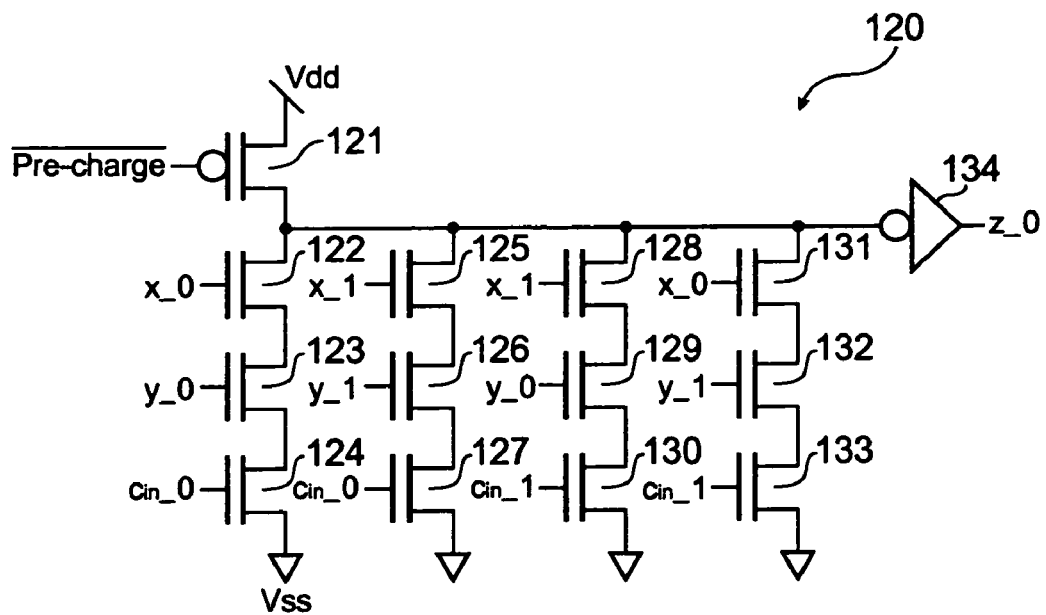
FIG. 7 is a block diagram of a z_0 output circuit.
Figure 8:
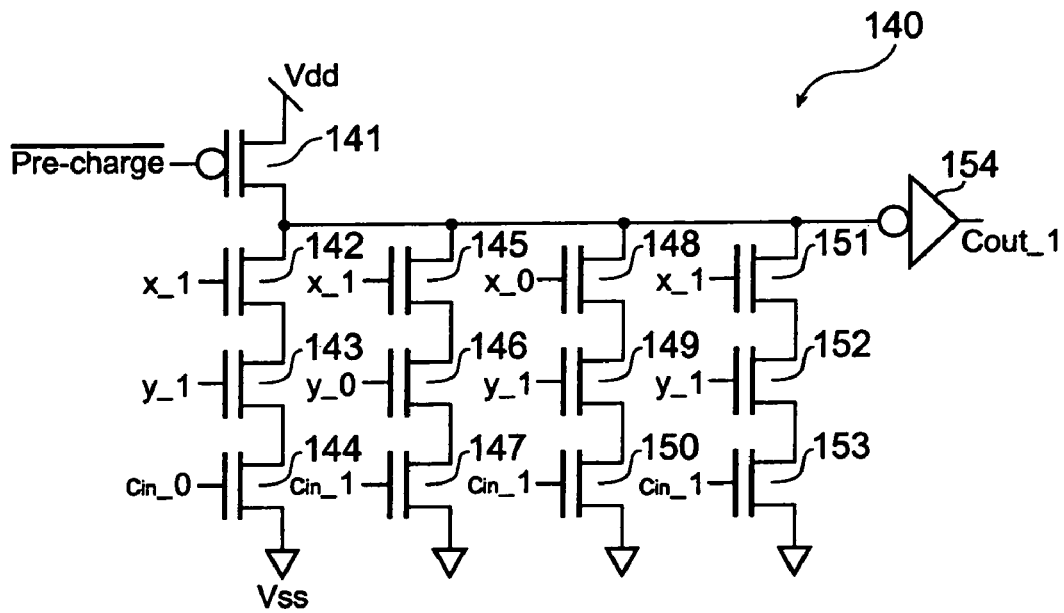
FIG. 8 is a block diagram of a Cout_1 output circuit.
Figure 9:
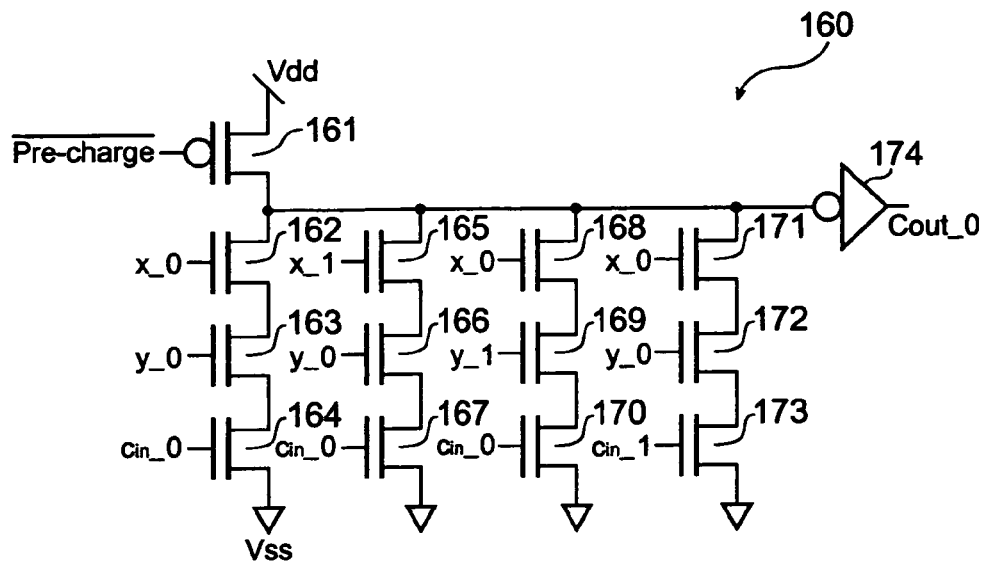
FIG. 9 is a block diagram of a Cout_0 output circuit.

Transistors 101-113 are coupled as shown in FIG. 6 in the Z_1 output circuit 100. Transistors 121-133 are coupled as shown in FIG. 7 in the Z_0 output circuit 120. Transistors 141-153 are coupled as shown in FIG. 8 in the Cout_1 output circuit 140. Transistors 161-173 are coupled as shown in FIG. 9 in the Cout_0 output circuit 160. Inverters 114, 134, 154 and 174 are inverter circuits inverting the logic.

The transistors 101, 121, 141 and 161 are made of p-channel metal-oxide-semiconductor field effect transistor (MOSFET) and the pre-charge signal PC is inputted into these transistors. When the pre-charge signal PC is supplied and all the input values are "Null", the outputs of the transistors 101, 121, 141 and 161 become "L" level. In other cases, the outputs of the transistors respectively depend on the valid codeword ("0" or "1") of the corresponding input values. Other transistors are made of n-channel MOSFET. They conduct when the input values are "H" level and they do not conduct when the input values are "L" level. Therefore, for example, in the Z_1 output circuit 100 shown in FIG. 6, when all the input values X_1, y_0 and Cin_0 become "H" level, in other words, when the X_1, y_0 and Cin_0 becomes {1,1,1}, a low voltage power is applied to the transistors 102-104 coupled in cascade. Consequently, the output Z_1 becomes {1}. In such manner, the output is specified according to the truth table shown in Table 2.

It is preferable that the timing when the p-channel MOSFET turns off from on is not later than the timing when the n-channel MOSFET turns on from off in order to prevent a though-current from running from a high-potential power source Vdd to a grand potential Vss. The connections among the n-channel MOSFETs may be optimized according to need and the number of the transistors may be reduced. For example, the transistors 104 and 107 may be alternated with a single transistor. Moreover, it is obvious from the formula (2) that the carry output "Cout" always becomes "1" when the input values x (n) and y (n) are "1" regardless of the value of the carry input "Cin". Therefore, a combinational circuit in which "Cout_1" becomes "1" when "x_1" and "y_1" are "1" irrespective of whether "Cin_1" is "1" or "0" may be formed. Furthermore, a circuit made of a plurality of the p-channel MOSFETs may be adopted as the output circuit instead of the circuit made of the n-channel MOSFETs.

Truth table of the logical negation circuit 12 (n) is shown in Table 3.

TABLE 3

| Input | | Output | |
|---|---|---|---|
| In_1 | In_0 | Out_1 | Out_0 |
| 0 | 0 | 0 | 0 |
| 0 | 1 | 1 | 0 |
| 1 | 0 | 0 | 1 |

As shown in Table 3, when an input value "In" is the invalid codeword "Null", an output value "Out" becomes "Null". When the input value "In" is the valid codeword "0" or "1", the logic is inverted and the inverted value "1" or "0" is outputted.

The operator "Operator" provided from the main processing unit 2 is also encoded by the dual-rail encoding. The output of the operator becomes "0" in case of the addition, "1" in case of the subtraction and "Null" at the time of the non-operation state when the operation of the one arbitrary-precision value X and all the operations of Y are finished. When the operator "Operator" is the valid codeword "0", the selection circuit 11 select the second input value y (n) which has not gone through the logical negation circuit 12 (n) in order to perform the addition. When the operator "Operator" is the valid codeword "1", the selection circuit 11 select the second input value y (n) which has gone through the logical negation circuit 12 (n) and logically inverted according to the truth table shown in Table 3 in order to perform the subtraction. When the operator "Operator" is the invalid codeword "Null", the selection circuit 11 makes all the outputs "Null".

Second Practical Example

Figure 10:
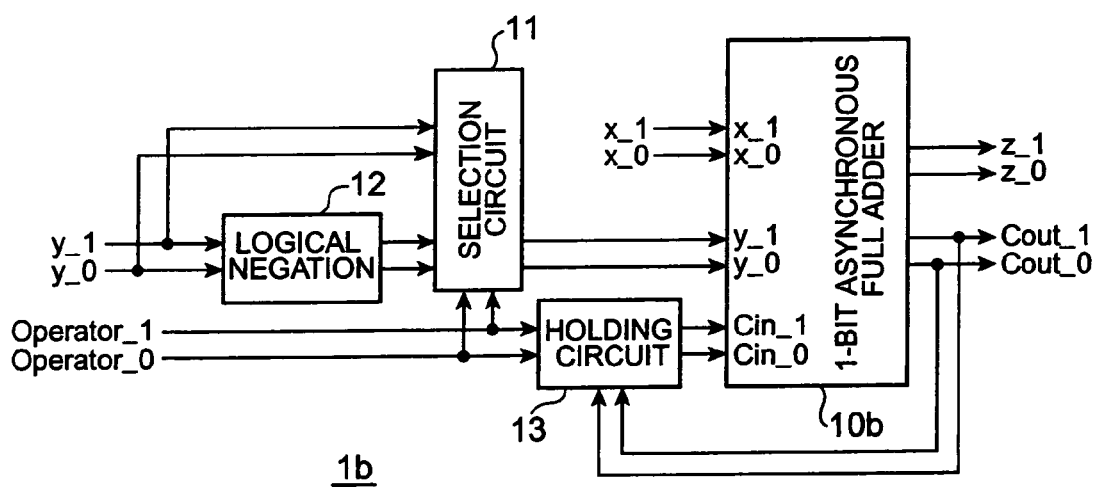
FIG. 10 is a block diagram of a 1-bit arithmetic unit according to a second practical example.

A practical example of the 1-bit arithmetic unit which is the N-bit arithmetic unit of the invention with N=1 is shown in FIG. 10.

A 1-bit arithmetic unit 1b here only deals with 1 bit data. Therefore, the input data here are only the first input values x_1 and x_0 and the second input values y_1 and y_0 which are encoded by the dual-rail encoding, and operators "Operator", "Operator_1" and "Operator_0" as shown in FIG. 10. Consequently, only one 1-bit asynchronous full adder 10b, which is described in the first practical example, is provided in the 1-bit arithmetic unit 1b. The configuration of the 1-bit asynchronous full adder 10b is not particularly changed and is the same as the one shown in the first practical example (see FIGS. 4 thought 9). This means that the 1-bit asynchronous full adder 10b operates according to the truth table shown in Table 2.

Also, only one logical negation circuit 12 is provided here in order to handle 1 bit data. The selection circuit 11 is the same as the one in the first practical example except that it only handles 1 bit data. In other words, the selection circuit is controlled by the operator {Operator_1, Operator_0}. When the operator "Operator" is {0, 1}, the second input value "y" is outputted as it is without being inverted. When the operator "Operator" is {1, 0}, the input value is inverted at the logical negation circuit 12 and then outputted. When the operator "Operator" is {0, 0} or "Null", "Null" is outputted.

When the invalid codeword "Null" as the operator "Operator" is inputted in the holding circuit 13, the holding circuit 13 outputs "0". If the first valid codeword inputted after the "Null" is "0", the holding circuit 13 then outputs "0". If the first valid codeword inputted after the "Null" is "1", the holding circuit 13 then outputs "1". The subtraction is correctly implemented by adding the "1" to the logically inverted value of the input value "y". In other words, the subtraction is carried out, in a precise sense, by adding a value which is expressed in the 2's complement. The operation is started when the operator "Operator" is changed from "Null" into the valid codeword. The value of the operator inputted following the beginning of the operation is added to the 1-bit asynchronous full adder 10b instead of the carry "Cin". If the operator is "0" which shows the addition, "0" is inputted as the carry input "Cin". However, it is "0" so that the additional value remains unchanged. If the operator is "1" which shows the subtraction, "1" is inputted as the carry input "Cin". At the same time, the carry input "Cin" is added to the 1's complement of the second input value "y" generated at the logical negation circuit 12. Therefore, it is equivalent to adding the 2's complement of the second input value "y" to the 1-bit asynchronous full adder 10b. Accordingly, the equivalent operation to the subtraction of the second input value "y" from the first input value "x" is implemented.

The carry output "Cout_1" and "Cout_0" of the 1-bit asynchronous full adder 10b are separately inputted in the holding circuit 13. After the beginning of the operation, the first 1-bit operation in which the operator "Operator" is added to the carry input "Cin" is performed and the carry output "Cout" is then inputted as a result to the holding circuit 13. The holding circuit 13 latches the result. Subsequently, the carry output "Cout" once becomes "Null" for the next bit operation, and then the carry output "Cout" of the previous operation which is retained in the holding circuit 13 is added to the carry input "Cin".

The latching of the operator "Operator" by the holding circuit may not be necessary. If the value "1" is allowed as error, the value of the operator "Operator" may not be latched and the carry input "Cin" may be made to be "0" at the time of the first operation after the beginning of the operation.

The main processing unit 2 is also made so as to sequentially output 1 bit data in order to accommodate with the 1-bit arithmetic unit 1b. More specifically, N=1 is set in the main processing unit 2 shown in FIG. 1 and the split means 21 splits up the arbitrary-precision values X and Y by 1 bit each. The output means 22 reads out the divided arbitrary-precision values X and Y in the-least-significant-bit-first order one bit by one bit and outputs them according to the pre-charge signal PC.

Figure 11:
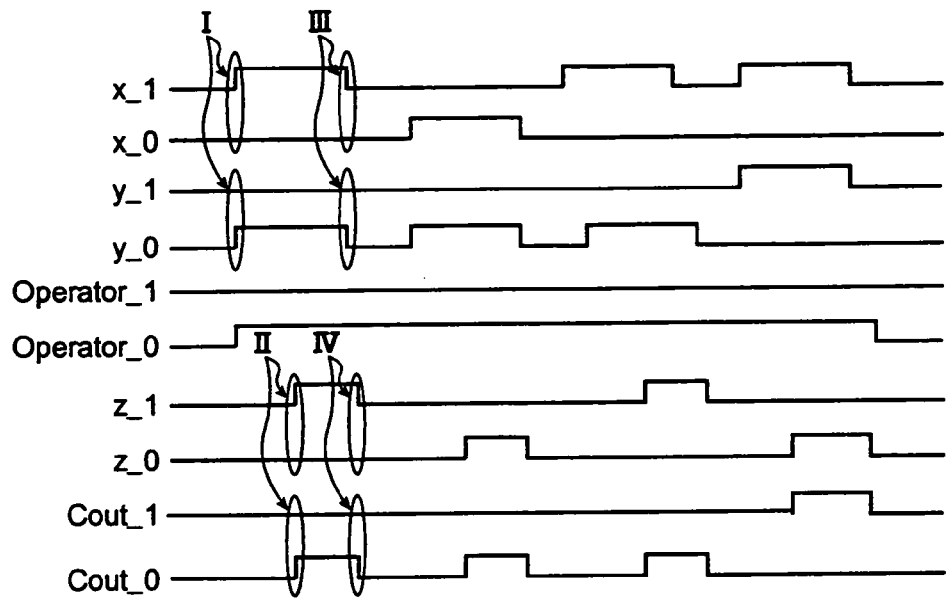
FIG. 11 is a timing chart of the 1-bit arithmetic unit according to the second practical example.

FIG. 11 is a timing chart of the 1-bit arithmetic unit 1b according to the second practical example when the addition and subtraction with 4-bit precision is performed by using the 1-bit arithmetic unit 1b. As shown in FIG. 11, four-phase handshaking scheme is adopted in the timing chart. In other words, the main process unit 2 outputs "Null" to all the inputs before the beginning of the operation. After the begging of the operation, the following procedures I-IV is repeated four times with respect to each 1 bit operation.

(I) Corresponding bit data is outputted to the input values "x" and "y";

(II) The output value "z" and the carry output "Cout" are outputted from the adder after a predetermined time past;

(III) "Null" is outputted to the input values "x" and "y" after the output value "z" is taken by an external part and the carry output "Cout" is taken by the holding circuit 13; and (IV) After a predetermined time past, "Null" is outputted to the output value "z" and the carry output "Cout" of the adder.

In FIG. 11, the following values are shown as examples of the first input value "x", the second input value "y" and the operator "Operator".

Input value "x": "1101"=({1, 0}, {1, 0}, {0, 1}, {1, 0});
Input value "y": "1000"=({1, 0}, {0, 1}, {0, 1}, {0, 1}); and
Operator "Operator": "0"={0, 1} (addition)

It can tell from the timing chart shown in FIG. 11 that the main processing unit 2 is inhibited from outputting "Null" to the operator "Operator" every time the 1 bit operation is performed in this practical example. When the main process is made in this way, the holding circuit 13 latches the valid codeword ("0" in the timing chart) only once when the operator "Operator" is turned from the invalid codeword "Null" into the valid codeword. The holding circuit 13 maintains the state until the next "Null" is outputted to the operator. In this way, if "0" or "1" specifying the addition or the subtraction is outputted to the operator at the beginning, the same operation mode can be maintained until the bit operation finishes. Furthermore, it is possible to notify the 1-bit arithmetic unit 1b of the end of the bit operation by outputting "Null" to the operator "Operator".

According to the above-described first embodiment, the addition and the subtraction of a value of arbitrary precision can be performed by the N-bit repeat operation or even 1 bit unit repeat operation as described above at the extreme.

Moreover, according to the first embodiment, the "Null" output of the operator "Operator" is used as the recognition information specifying the end of the arbitrary-precision operation. Thereby, it is possible to recognize the end of the operation of the arbitrary-precision value by monitoring the operator from the N-bit arithmetic unit side.

Furthermore, according to the first embodiment, when the operator "Operator" indicates the subtraction, the holding circuit 13 outputs "1" to the N-bit full adder and it is added to the logically inverted value of another input value. Therefore, the value information that is added at the time of the subtraction can be included in the operator "Operator" in addition to the indication of the subtraction. Consequently, the correct subtraction is possible with a simple circuit configuration.

According to the first embodiment, the arithmetic unit can be made of either the synchronous circuits or the asynchronous circuits. Particularly, problems that tend to occur in the asynchronous circuits moved by a global clock, such as the clock delay, clock skew and clock jitter, hardly occur with the synchronous circuits' configuration.

In the asynchronous circuits, a smallest functional circuit is controlled by event driving and it only works only when it is required to operate autonomously and when it is required to operate heteronomously. This means that each smallest functional circuit can work independently from other smallest functional circuits and can operate in parallel. Therefore, the smallest functional circuit does not have to wait until the end of the other smallest functional circuits' operation and can implement a desired process whenever it completes the preparation for conducting the desired process. For this reason, the asynchronous circuits are appropriate for the circuits of the invention in which the arbitrary-precision operation can be performed by repeatedly conducting the simple addition/subtraction operation. Therefore, even when the arbitrary-precision value has a large digit number, it is possible to conduct the process at high speed.

Second Embodiment

A second embodiment of the invention relates to a configuration of the N-bit arithmetic unit in which the number of the input lines is reduced.

Figure 12:
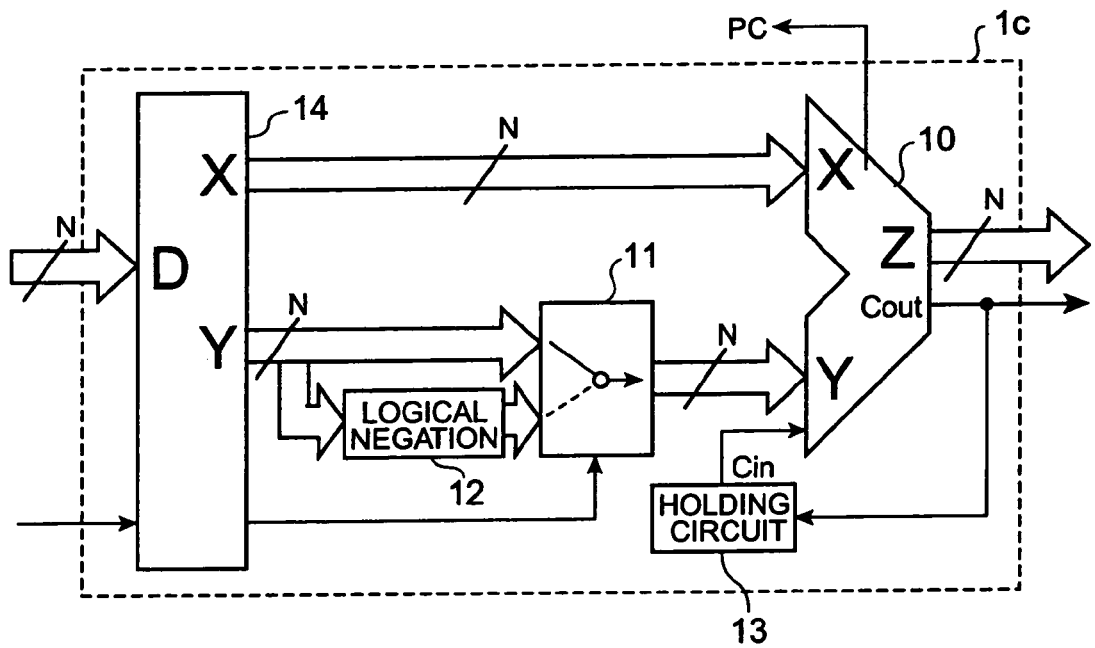
FIG. 12 is a block diagram of an N-bit arithmetic unit according to a second embodiment.

FIG. 12 is a block diagram of an N-bit arithmetic unit $1c$ according to the second embodiment.

As shown in FIG. 12, the N-bit arithmetic unit $1c$ of the second embodiment further has a latching circuit 14 in addition to the configuration of the N-bit arithmetic unit 1 described in the first embodiment with reference to FIG. 2. The first input value "X" and the second input value "Y" are inputted though a single input line D into the latching circuit 14, they are then latched by the latching circuit 14 and provided to the N-bit full adder 10. The operator "Operator" is also inputted in the latching circuit 14, the latching circuit 14 supplies the operator to the selection circuit 11 and the first input value "X" and the second input value "Y" are then latched by the latching circuit 14. The operator "Operator" may be sent through the input line D. Other configuration is the same as those of the first embodiment.

In other words, the latching circuit 14 latches the operator "Operator", the first input value "X" and the second input value "Y" that are sent through the input line D at the different time and outputs them to the corresponding circuits.

The main processing unit 2 sequentially outputs the operator "Operator", the first input value "X" and the second input value "Y" according to the N-bit arithmetic unit $1c$. The first input value and the second input value are distinguished by interposing "Null" output between each data. If a sequence of the data transmission is specified in advance, each data is correctly reflected. For example, when the first input value "X" and the second input value "Y" is sent in this order, the main process switches the operator "Operator" from "Null" to "0"/"1" depending on the addition or the subtraction and switches the selection circuit 11. The main process subsequently sends "Null" and then outputs the first input value "X". The first input value "X" is outputted to the N-bit full adder 10 from the latching circuit 14. Subsequently, the main process subsequently sends "Null" and then outputs the second input value "Y". If the operator "Operator" indicates the addition, the selection circuit 11 selects the second input value "Y" to which the logical negation is not performed and the "Y" of the positive logic is provided to the N-bit full adder 10. If the operator "Operator" indicates the subtraction, the selection circuit 11 selects the second input value "Y" to which the logical negation is performed and the "Y" of the negative logic is provided to the N-bit full adder 10.

The operator may be outputted through the input line D. In this case, the operator "Operator", the first input value "X" and the second input value "Y" are respectively supplied to the latching circuit 14 at different time.

According to the above-described second embodiment, the first input value and the second input value are inputted trough the same input line to the latching circuit with time lag and the latching circuit then latches them so as to output them. Therefore, in addition to the advantageous effect of the first embodiment, the second embodiment has an advantage that the number of the input line can be limited and a compact configuration is possible.

Third Embodiment

The arithmetic unit of arbitrary precision according to the invention can be applied to any computing devices and electronic equipment embedded with such computing device.

Figure 13:
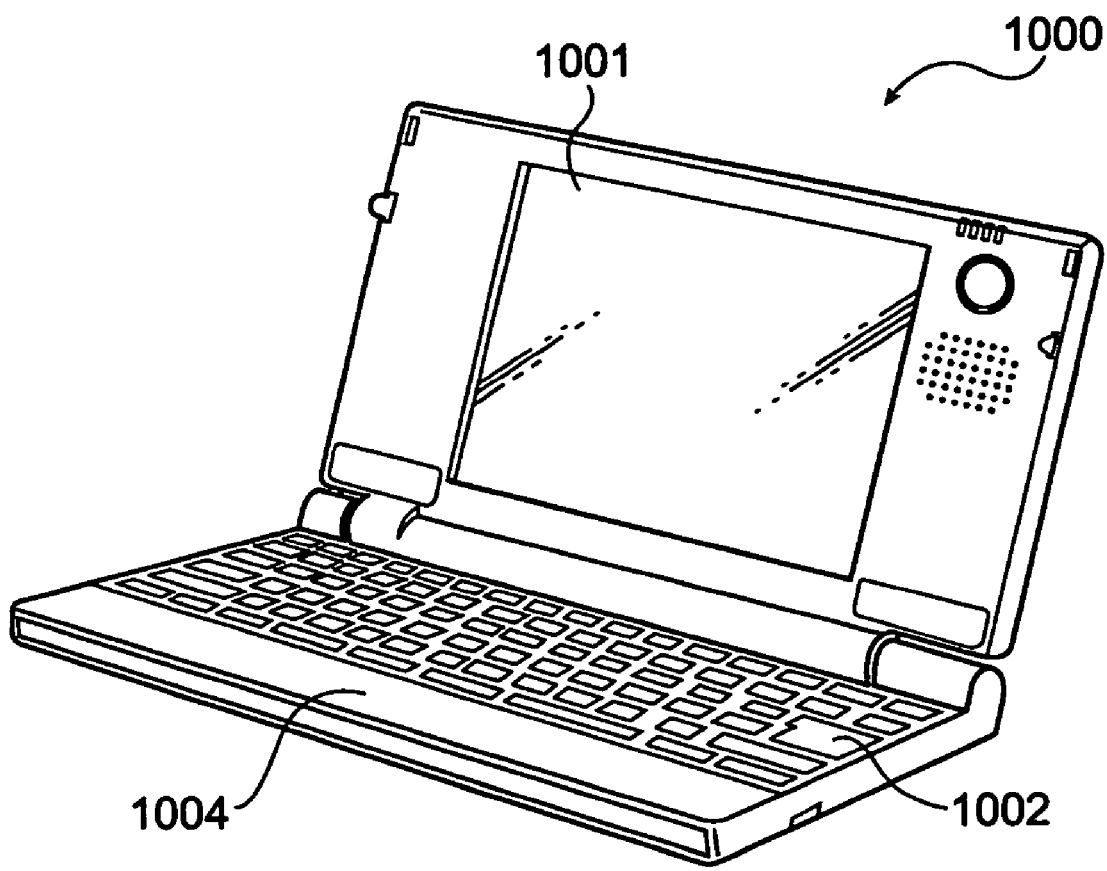
FIG. 13 shows an example of electronic equipment according to a third embodiment.

FIG. 13 is an outline view of an example of such electronic equipment, a laptop-type personal computer device. This personal computer device 1000 has a liquid display 1001, a keyboard 1002 and a microprocessor circuit 1004 inside. The arbitrary-precision arithmetic unit of the invention can be applied as an arithmetic unit of the microprocessor circuit 1004.

The arbitrary-precision arithmetic unit of the invention can be applied to the general equipment requiring the general-purpose operation. Such equipment may include a calculator, an electronic databook, a personal digital assistant (PDA), a cellular phone, an IC card and a smart card. The arbitrary-precision arithmetic unit of the invention has a high degree of availability for the general equipment requiring such operations because it can perform the high-precision operation with the simple circuit configuration.

What is claimed is:

1. An arithmetic unit of arbitrary precision, comprising:
a main processing unit splitting up first and second arbitrary-precision values into a number m of N-bit operands respectively in the-least-significant-bit-first order and consecutively outputting a series of a pair of first and second N-bit operands,
wherein N is a natural number,
wherein m is an integer greater than 0,
wherein the first arbitrary-precision value is P-bits in length and the second arbitrary-precision value is Q-bits in length satisfying P<Q,
wherein "0" is set to bits in higher order than a most significant bit (MSB) of the first arbitrary-precision value such that the lengths of the first and second arbitrary-precision values are equal, and
wherein "0" is set to bits in higher order than a MSB in the mth N-bit operand of each respective arbitrary-precision value; and
an N-bit arithmetic unit computing with the first and second N-bit operands fed from the main processing unit, while autonomously requesting, without clocking, the main processing unit to supply a next pair of the first and second N-bit operands each time the computation completes and autonomously feeding, without clocking, a carry generated by the computation to the next pair of the first and second N-bit operands until a null operator is provided to the N-bit arithmetic unit,
the N-bit arithmetic unit including an asynchronous circuit driven by a handshaking scheme, and at least one of input/output signals being encoded by a dual-rail encoding scheme, and
the at least one of input/output signals encoded by the dual-rail encoding scheme representing one of four operator values,
wherein the four operator values consist of the null operator, an addition operator, a subtraction operator, and an inhibit operator.

2. The arithmetic unit for computing with arbitrary-precision data according to claim 1, wherein the first and second N-bit operands for a next N-bit operation are supplied each time the N-bit arithmetic unit requests the next N-bit operation.

3. The arithmetic unit of arbitrary precision according to claim 2, wherein the arithmetic unit supplies the N-bit arithmetic unit with an operator instructing the N-bit arithmetic unit to perform addition or subtraction and signaling an end of an arbitrary-precision calculation when an operation with a most significant N-bit operands completes by supplying the N-bit arithmetic unit with a specific value of operator.

4. An electronic equipment, comprising:
the arithmetic unit of arbitrary precision according to claim 1.

5. An arithmetic unit of arbitrary precision, comprising:
an N-bit full adder autonomously adding, without clocking, first and second N-bit operands that are generated by a main processing unit by splitting up first and second arbitrary-precision values into a number m of N-bit operands respectively in the-least-significant-bit-first order, and autonomously requesting, without clocking, the main processing unit to supply a next pair of the first and second N-bit operands each time the computation completes until a null value for an operator is provided to the N-bit full adder,
wherein N is a natural number,
wherein m is an integer greater than 0,
wherein the first arbitrary-precision value is P-bits in length and the second arbitrary-precision value is Q-bits in length satisfying P<Q,
wherein "0" is set to bits in higher order than a most significant bit (MSB) of the first arbitrary-precision value such that the lengths of the first and second arbitrary-precision values are equal, and
wherein "0" is set to bits in higher order than a MSB in the mth N-bit operand of each respective arbitrary-precision value; and
a carry holding circuit holding a carry generated by the N-bit full adder and feeding the carry to the N-bit full adder for the next operation,
the N-bit full adder including an asynchronous circuit driven by a handshaking scheme, at least one of input/output signals being encoded by a dual-rail encoding scheme, and
the at least one of input/output signals encoded by the dual-rail encoding scheme representing one of four operator values,
wherein the four operator values consist of a null operator, an addition operator, a subtraction operator, and an inhibit operator.

6. The arithmetic unit of arbitrary precision according to claim 5, further comprising:
a logical negation circuit generating logical negation of the second operand; and
a selecting circuit selecting the logical negation instead of the second operand for the N-bit full adder in a case that an operation indicated by the operator is subtraction.

7. The arithmetic unit of arbitrary precision according to claim 6, wherein in a case that the operator indicates subtraction, the holding circuit supplies a value "1" just for a first time of an N-bit operation and subsequently the carry generated and carried over from a last operation to the N-bit full adder, which adds the logical negation of the second operand and the value from the carry holding circuit to the first operand to achieve subtraction.

8. The arithmetic unit of arbitrary precision according to claim 7, further comprising:
a latching circuit, to which the first and second operands are sequentially inputted through a same input port, latching the first and second operands and then supplying the first and second operands to the N-bit full adder.

9. The arithmetic unit of arbitrary precision according to claim 8, wherein the operator is first inputted to and is latched by the latching circuit that consecutively latches the first and second operands sequentially inputted through the same input port.

10. An arithmetic unit of arbitrary precision, comprising:
a splitting unit splitting first and second arbitrary-precision values into a number m of N-bit operands respectively in a least-significant-bit-first order for computing with arbitrary-precision data,
wherein N is a natural number,
wherein m is an integer greater than 0,
wherein the first arbitrary-precision value is P-bits in length and the second arbitrary-precision value is Q-bits in length satisfying P<Q,
wherein "0" is set to bits in higher order than a most significant bit (MSB) of the first arbitrary-precision value such that the lengths of the first and second arbitrary-precision values are equal, and
wherein "0" is set to bits in higher order than a MSB in the mth N-bit operand of each respective arbitrary-precision value; and
a supplying unit sequentially supplying first and second N-bit operands to a N-bit arithmetic unit, the N-bit arithmetic unit autonomously requesting the first and second N-bit operands without clocking, until a null value for an operator is provided to the N-bit arithmetic unit;
the N-bit arithmetic unit including an asynchronous circuit driven by a handshaking scheme, at least one of input/output signals being encoded by a dual- rail encoding scheme, and
the at least one of input/output signals encoded by the dual-rail encoding scheme representing one of four operator values,
wherein the four operator values consist of a null operator, an addition operator, a subtraction operator, and an inhibit operator.

11. An operation method for computing with arbitrary-precision data by an arithmetic unit of arbitrary precision including an asynchronous circuit driven by a handshaking scheme and at least one of input/output signals being encoded by a dual-rail encoding scheme, the operation method comprising:
the asynchronous circuit performing the steps of:
splitting first and second arbitrary-precision values into a number m of N-bit operands in a-least-significant-bit-first order,
wherein N is a natural number,
wherein m is an integer greater than 0,
wherein the first arbitrary-precision value is P-bits in length and the second arbitrary-precision value is Q-bits in length satisfying P<Q,
wherein "0" is set to bits in higher order than a most significant bit (MSB) of the first arbitrary-precision value such that the lengths of the first and second arbitrary-precision values are equal, and
wherein "0" is set to bits in higher order than a MSB in the mth N-bit operand of each respective arbitrary-precision value;
sequentially outputting a series of pairs of first and second N-bit operands;

giving a permission to output a next pair of the first and second N-bit operands each time a next N-bit operation is autonomously requested, without clocking;

and outputting a null value for an operator when a computation with arbitrary-precision is completed, wherein the at least one of input/output signals encoded by the dual-rail encoding scheme represent one of four operator values, wherein the four operator values consist of a null operator, an addition operator, a subtraction operator, and an inhibit operator.

12. An operating method of computing with arbitrary-precision data by an arithmetic unit of arbitrary precision including an asynchronous circuit driven by a handshaking scheme and at least one of input/output signals being encoded by a dual-rail encoding scheme, the operating method comprising:

the asynchronous circuit performing the steps of:

computing with a pair of first and second N-bit operands that are split from first and second arbitrary-precision values into a number m of N-bit operands respectively in a-least-significant-bit-first order, wherein N is a natural number, wherein m is an integer greater than 0, wherein the first arbitrary-precision value is P-bits in length and the second arbitrary-precision value is Q-bits in length satisfying P<Q, wherein "0" is set to bits in higher order than a most significant bit (MSB) of the first arbitrary-precision value such that the lengths of the first and second arbitrary-precision values are equal, and wherein "0" is set to bits in higher order than a MSB in the mth N-bit operand of each respective arbitrary-precision value;

autonomously requesting, without clocking, a next N-bit operation each time a current operation finishes up, until a null value for an operator is provided to an N-bit arithmetic unit, and feeding a carry generated from the current operation to the next N-bit operation, wherein the at least one of input/output signals encoded by the dual-rail encoding scheme represent one of four operator values, wherein the four operator values consist of a null operator, an addition operator, a subtraction operator, and an inhibit operator.

* * * * *